United States Patent [19]

Holtzberg et al.

[11] 4,432,925
[45] Feb. 21, 1984

[54] COMPOSITE PISTON RING AND PROCESS

[75] Inventors: Matthew W. Holtzberg, Ringwood, N.J.; Lawrence D. Spaulding, Naperville, Ill.

[73] Assignee: Standard Oil Company, (Indiana), Chicago, Ill.

[21] Appl. No.: 387,363

[22] Filed: Jun. 11, 1982

[51] Int. Cl.³ .............................................. F16J 9/28
[52] U.S. Cl. .................................. 264/235; 264/236; 264/328.12; 277/216; 277/DIG. B
[58] Field of Search ............ 277/227, 216, 1, DIG. 6; 264/235, 236, 328.12

[56] References Cited

U.S. PATENT DOCUMENTS

| 3,183,008 | 5/1965 | Yost | 277/227 |
| 3,748,304 | 7/1973 | Stephens | 528/210 |
| 4,016,140 | 4/1977 | Morello | 264/331.19 |
| 4,017,459 | 4/1977 | Onder | 260/47 CP |
| 4,098,775 | 7/1978 | Onder | 528/350 |
| 4,151,222 | 4/1979 | Hergenrother et al. | 528/75 |
| 4,224,214 | 9/1980 | Chen | 264/325 |

OTHER PUBLICATIONS

Wise, Charles "Plastic Engine is Off and Running" *Machine Design*, vol. 52 No. 10 (May 8, 1980) pp. 24-26, TJ. 1. M16.

*Primary Examiner*—William A. Cuchlinski, Jr.
*Attorney, Agent, or Firm*—Thomas W. Tolpin; William H. Magidson; William T. McClain

[57] ABSTRACT

A lightweight composite piston ring is provided to decrease fuel consumption, attenuate noise, and permit increased speed of operation.

26 Claims, 6 Drawing Figures

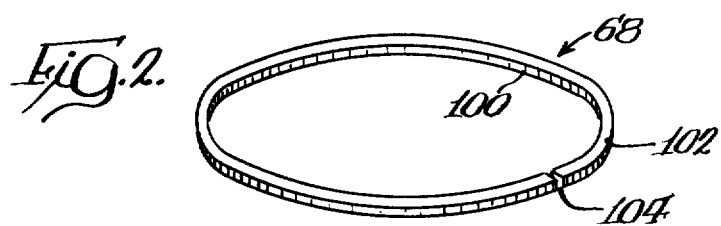
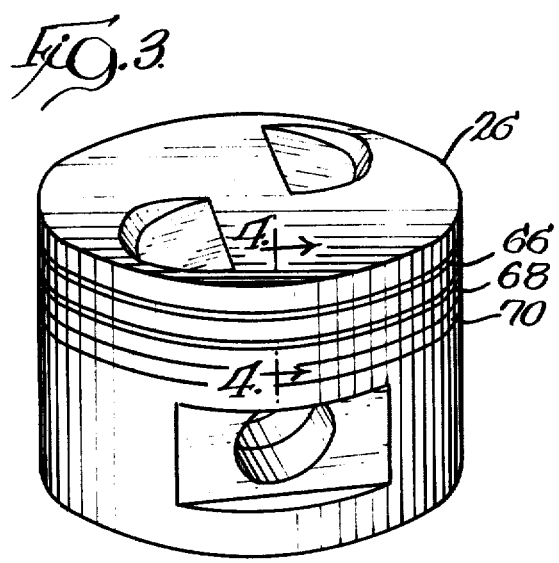
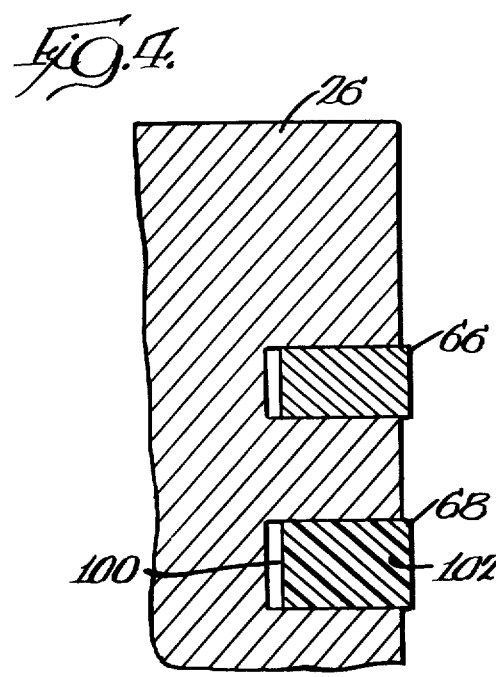
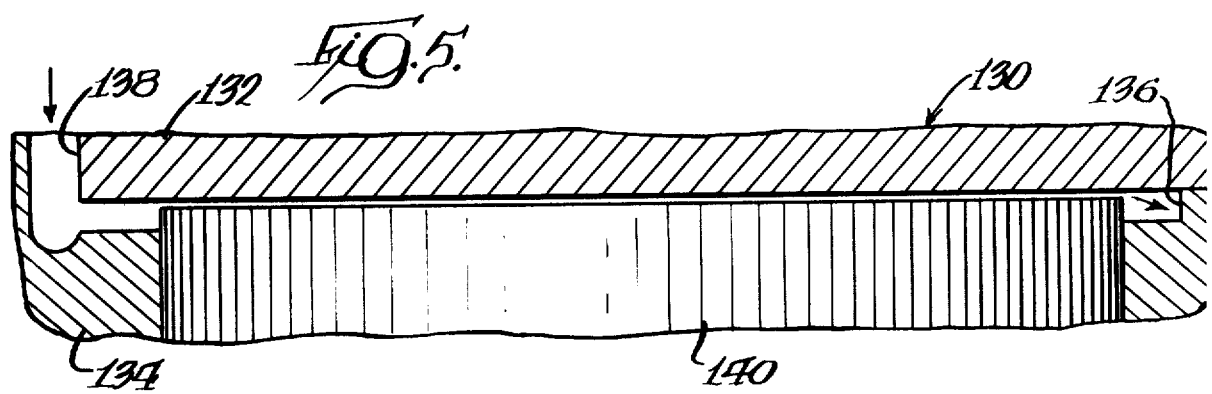
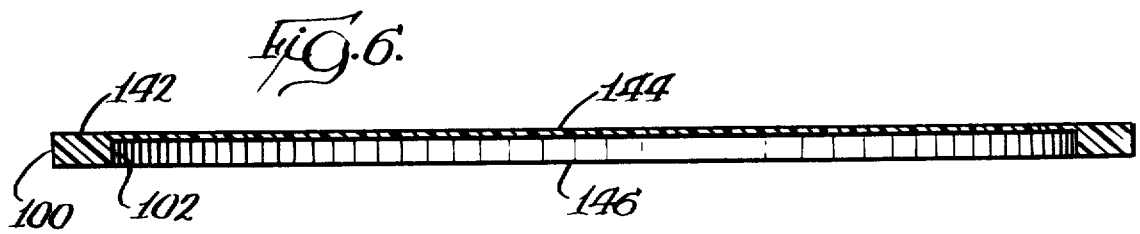

COMPOSITE PISTON RING AND PROCESS

BACKGROUND OF THE INVENTION

This invention relates to engines, and more particularly, to engine parts and a process for making the same.

Traditionally, engines have been made of metal, usually steel or cast iron. Steel and cast iron engines are useful, except they are quite heavy and consume considerable amounts of gasoline or diesel fuel. Conventional engines exert large compressive forces, considerable torque, and substantial secondary harmonic vibrations which have to be dampened by counterbalancing pistons, flywheels, dampeners, etc. The moving metal parts of cast iron and steel engines generate high centrifugal, reciprocating, and inertial forces, momentum, and loads. Generally, the weight of the engine adversely affects its performance, efficiency, and power.

Recently, it has been suggested to use plastic engine parts in automotive engines. Such suggestions have appeared in the December 1980 issue of *Automotive Industries* at pages 40–43, in an article entitled, "What . . . a Plastic Engine!?"; in the May 8, 1980 issue of *Machine Design*, Volume 52, No. 10, in an article entitled, "Plastic Engine Is Off And Running," and in French Application No. 2,484,042, published Dec. 11, 1981.

An experimental prototype engine with concealed plastic engine parts was displayed at the Society of vutomotive Engineers' (SAE) Show in Detroit, Mich. in February 1980.

Over the years, amide-imide polymers have been developed for use in molding and producing various products, such as wire coatings, enamels, films, impregnating materials, and cooking utensils. Typifying these prior art amide-imide products, polymers and molding processes are those described in U.S. Pat. Nos. 3,546,152; 3,573,260; 3,582,248; 3,660,193; 3,748,304; 3,753,998; 4,016,140; 4,084,144; 4,136,085; 4,186,236; 4,167,620; and 4,224,214. These prior art products, polymers, and molding processes have met with varying degrees of success.

It is, therefore, desirable to produce a lightweight engine part.

SUMMARY OF THE INVENTION

An improved lightweight composite engine part is provided for use in gasoline and diesel powered automotive engines, truck engines, aircraft engines, marine engines, single and two cylinder engines, such as lawn mower engines, portable generators, and other internal combustion engines. The lightweight composite engine part decreases gasoline and fuel consumption, attentuates noise for quieter performance, and permits increased speed of operation. The lightweight composite engine part produces higher horsepower for its weight than conventional engine parts, while maintaining its shape, dimensional stability, and structural integrity at engine operating conditions. The lightweight composite engine part decreases centrifugal, reciprocating, and inertial forces, momentum, and load on the engine.

The composite engine part has a greater stiffness-to-weight ratio than metal, is flame resistant, and is stable to heat. The composite engine part is capable of effectively functioning at engine operating temperatures and start-up conditions during hot and cold weather. The composite engine part has high mechanical strength, thermal stability, fatigue strength, and excellent tensile, compressive, and flexural strength. The composite engine part is resistant to wear, corrosion, impact, rupture, and creep, and reliably operates in the presence of engine fuels, oils, and exhaust gases.

In contrast to metals, such as cast iron, steel, aluminum, titanium, and to thermosetting resins, such as epoxy resin, the composite engine part can be injection molded. Injection molding permits closer tolerances with less secondary machining operations for production efficiency and economy. Finished surfaces of injected molded composite engine parts are of better quality and have fewer knit lines, seams, and flashes than do engine parts made from cold metal forging, casting, fabrication, or other conventional techniques. If desired, some of the composite engine parts can be insert molded or compression molded.

The lightweight composite engine part is made of durable, impact-resistant, hybrid or composite material which includes special proportions of an amide-imide resinous polymer, preferably reinforced with graphite and/or glass fibers. The amide-imide resinous polymer can also be blended with polytetrafluoroethylene (PTFE) and/or titanium dioxide. Composite engine parts which are injection molded or otherwise made from amide-imide resinous polymers have better elongation, stiffness, moduli, and strength at engine operating conditions than do other plastics, such as epoxy resin, polyimides, aramids, polyphenylene sulfide, polytetrafluoroethylene, and nylon. A particularly suitable amide-imide resinous polymer is commercially available from Amoco Chemicals Corporation under the trademark and product designation TORLON.

In the invention of this application, the composite engine part takes the form of a thermoplastic, amide-imide resinous polymeric piston ring. The thermoplastic piston ring has an inner piston-engaging surface for snap-fitting interlocking engagement with a piston and an outer bearing surface for reciprocatingly sliding against a wall of an engine cylinder. The thermoplastic piston ring provides an oil and exhaust gas-impervious barrier which substantially prevents passage of oil and exhaust gases therethrough. In the preferred form, the piston ring provides a barrier ring which is mounted on the piston between a compression ring and an oil scraper ring. The thermoplastic piston ring provides a seal between the piston and the cylinder wall. Desirably, the piston ring is split on one end to provide a generally radial access opening.

The composite piston ring is preferably molded, allowed to cool below its plastic deformation temperature to solidify its shape, and then post cured by solid state polymerization to increase its strength. While the composite piston ring can be compression molded, the composite piston ring is preferably injection molded for closer tolerances, minimizing secondary machining operations, and increasing its strength. In the preferred injection molding process, a core is inserted in a cavity of die or mold to provide a split ring-shaped molding chamber. Thereafter, the amide-imide resinous polymer is injected into the cavity at a location adjacent the molding chamber to minimize knit lines in the molded piston ring and to increase uniformity and shorten polymeric flow length.

Composite piston rings decrease secondary harmonic vibrations, fluttering, and engine shaking, and enhance more efficient combustion temperatures.

A more detailed explanation of the invention is provided in the following description and appended claims taken in conjunction with the accompanying drawings.

BRIEF DESCRIPTION OF THE DRAWINGS

FIG. 2 is a perspective view of the composite piston ring;

FIG. 3 is a perspective view of a piston with the composite piston ring;

FIG. 4 is a fragmentary cross-sectional view of the piston and composite piston ring taken substantially along line 4—4 of FIG. 3;

FIG. 5 is a cross-sectional view of a die for injection molding the composite piston ring; and FIG. 6 is a cross-sectional view of an injection molded piston ring blank prior to machining.

DETAILED DESCRIPTION OF THE PREFERRED EMBODIMENT

Figure 1:
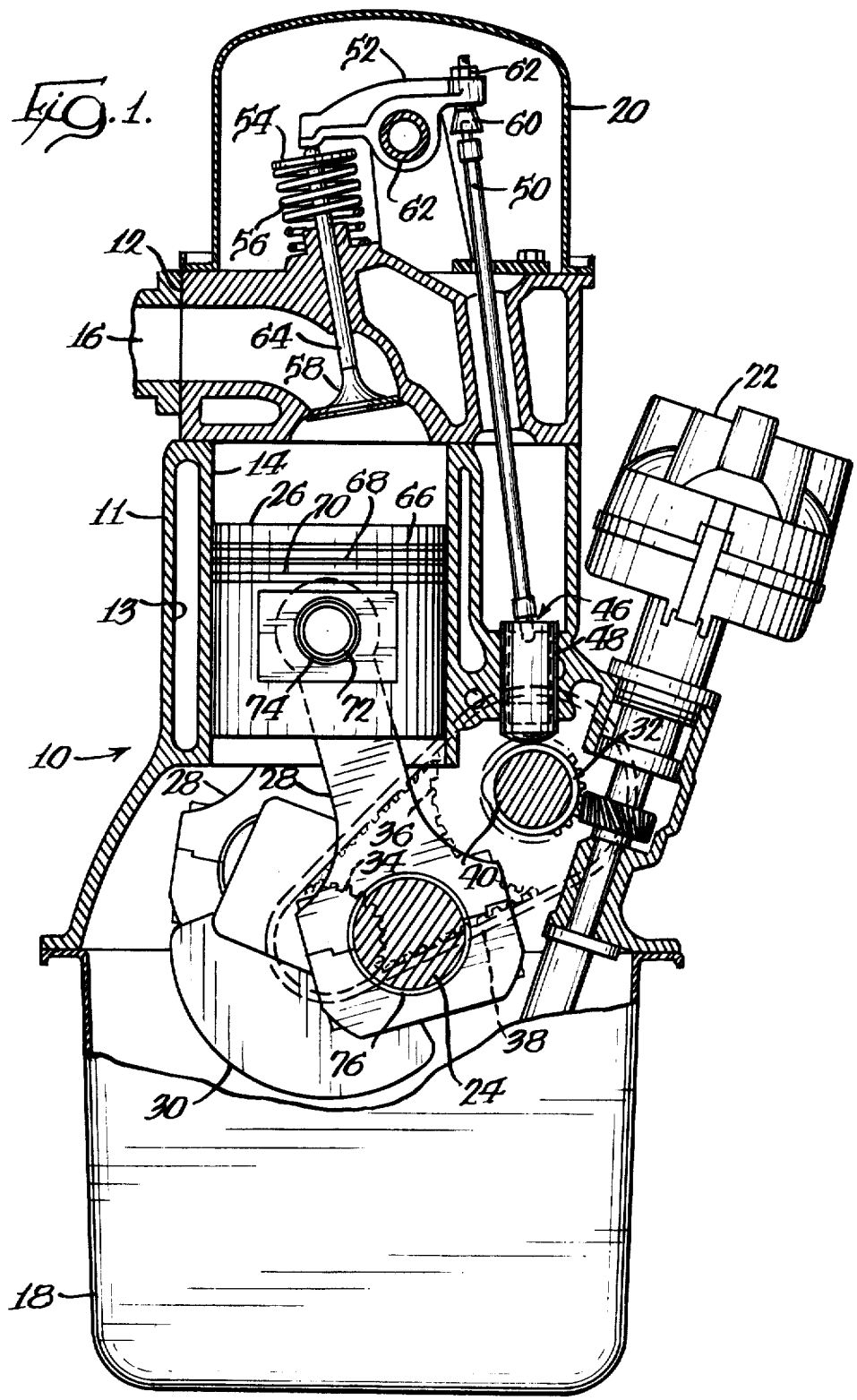
FIG. 1 is a cross-sectional view of an automotive engine with a composite piston ring in accordance with principles of the present invention.

The automotive engine 10 of FIG. 1 has lightweight composite engine parts to reduce its weight, decrease fuel consumption, and improve engine performance. Engine 10 is a gasoline powered, four stroke, spark ignition engine. The illustrated engine is a V-6 engine with 6 cylinders arranged in a V-shaped firing pattern.

While the composite engine parts are described hereinafter with particular reference to the illustrated engine, it will be apparent that the engine parts can also be used in other types of gasoline powered automotive engines, as well as in diesel powered automotive engines, truck engines, aircraft engines, marine engines, locomotive engines, lawn mower engines, portable generators, and other internal combustion engines. The composite engine parts can be used in 1, 2, 4, 6, 8 or more cylinder engines including V-arranged cylinder engines, aligned cylinder engines, horizontally opposed cylinder engines, rotary engines, etc.

As shown in FIG. 1, engine 10 has a cast iron block 11 and head 12. The block has many chambers including a cooling chamber 13 and six combustion chambers 14 which provide cylinders. The head has an exhaust manifold and an intake manifold 16 which communicate with the cylinders and an overhead carburetor (not shown). Extending below the block is an oil pan 18. Extending above the head is a rocker arm cover 20. A distributor 22 with an internal set of spark plugs (not shown) is provided to ignite the gaseous air mixture in the cylinders.

A metal crankshaft 24 drives the pistons 26 through connecting rods 28. A counterweight 30 on crankshaft 24 balances the pistons. The crankshaft 24 drives a metal camshaft 32 through a set of timing gears 34 and 36. The timing gears include a crankshaft gear or drive pulley 34 mounted on the crankshaft 24, and a camshaft gear or driven pulley 36 mounted on the camshaft 32. A fabric reinforced, rubber timing belt 38 or timing chain drivingly connects the crankshaft gear 34 and the camshaft gear 36. The camshaft gear 36 has twice the diameter and twice as many teeth as the crankshaft gear 34, so that the camshaft 18 moves at one-half the speed of the crankshaft. In some types of engines, the crankshaft gear drives the camshaft gear directly without a timing belt or timing chain.

Metal cams 40 are mounted on the camshaft 32 to reciprocatingly drive the valve trains 46. There are two or four valve trains per cylinder depending on the type of engine. Each valve train has a valve lifter 48, a push rod 50, a rocker arm 52, a valve spring retainer 54, a compression spring 56, and a valve 58 which opens and closes the exhaust manifold or the intake manifold 16. The intake valve 58 opens and closes the intake manifold 16. The exhaust valve opens and closes the exhaust manifold. The lifter 48 rides upon and follows the cam 40. The push rod 50 is seated in a recess of the filter and is connected to the rocker arm 52 by a threaded stud 60 and nut 62. The bottom end of the stud 60 is shaped complementary to the top end of the push rod to securely receive and engage the push rod. The rocker arm 52 pivots upon a rocker arm shaft, fulcrum or pin 62 and reciprocatingly drives the valve stem 64 of the valve 58.

The piston 26 reciprocatingly slides against a metal liner that provides the cylinder walls. A set of piston rings is press fit or snap fit on the head of the piston. The piston rings include a compression ring 66, a barrier ring 68, and an oil scraper ring 70. The piston is pivotally connected to the connecting rod 28 through a wrist pin 72 and a bushing 74. The connecting rod is pivotally connected to the crankshaft 24 through a split ring metal bearing 76.

In a four stroke internal combustion engine, such as the illustrated engine, each piston has an intake stroke, a compression stroke, a power stroke, and an exhaust stroke. During the intake stroke, the piston moves downward and the inlet valve is opened to permit a gaseous air mixture to fill the combustion chamber. During the compression stroke, the intake and exhaust valves are closed and the piston moves upward to compress the gaseous air mixture. During the power stroke, the spark plug is ignited to combust the gaseous air mixture in the combustion chamber and the rapidly expanding combustion gases drive the piston downward. During the exhaust stroke, the exhaust valve is opened and the piston moves upward to discharge the combustion gases (exhaust gases).

The pistons, as well as connecting rods, wrist pins, barrier piston rings, push rods, rocker arms, valve spring retainers, intake valves, and timing gears can be made of metal, although it is preferred that they are at least partially made of a thermoplastic, amide-imide resinous polymer to reduce the weight of the engine. Such amide-imide engine parts are referred to as composite engine parts. In some engines, the exhaust valve can also be at least partially made of a thermoplastic, amide-imide resinous polymer.

As shown in FIGS. 2–4, the composite, thermoplastic, amide-imide resinous polymeric, barrier piston ring 68 has an inner piston-engaging surface 100 for snap-fitting interlocking engagement with the piston 26 and an outer bearing surface 102 for reciprocatingly sliding against the cylinder wall. The thermoplastic piston ring 68 provides an oil and exhaust gas-impervious barrier, as well as a seal between the piston and the cylinder wall. The barrier ring 68 prevents oil which may have leaked past the oil scraper ring 70 from entering and contaminating the combustion chamber. The barrier ring 68 also prevents exhaust gases which might flow pas the compression ring 66 from escaping. Desirably, the composite piston ring maintains its shape and structural integrity at engine operating conditions.

The composite piston ring is split to define a radial access opening 104 through which the piston ring groove of the piston is inserted. The piston ring is sufficiently resilient to allow the ring to be expanded or twisted when the ring is inserted about the piston. The piston ring snaps back to its normally closed position after installation. The piston-engaging surface 100 of the piston ring has a diameter slightly smaller than the grooved piston ring-wall on which it fits for snap-fitting engagement with the piston. The illustrated composite piston ring is circular. Elliptical composite piston rings can be used with elliptical pistons. Surfaces of the piston ring can be angled, if desired. The composite piston ring is approximately 70% lighter than conventional cast iron #2 piston rings.

While the composite piston ring can be compression molded, the composite piston ring is preferably injection molded for closer tolerances, minimal secondary machining operations, and enhanced structural strength. As shown in FIG. 5, the injection mold 130 provides a die with an upper molding portion or cope 132 and a lower molding portion or drag 134. The mold has a series of die cavities 136 which are connected to each other by gates (not shown). The cavity should be well vented with vent holes preferably from 0.002 inch to 0.004 inch in diameter, and should have a draft from 0.5° to 1.5° to facilitate removal of the molded engine part.

An inlet or sprue 138 allows the injection moldable, amide-imide resinous polymer to flow into the cavity of the mold. The cavity has the general shape of the barrier piston ring without its center hole. A removable core pin or core 140 is inserted into the cavity of the mold to help form the hole in the piston. The core cooperates with the cavity to define a generally piston ring-shaped molding chamber.

In order to minimize knit lines in the injection molded piston ring, the sprue 138 should be located adjacent the molding chamber and the core 140 should be located along the axis of the piston ring. During injection molding, the amide-imide resinous polymer is injected into the molding cavity through sprue 138 at injection molding temperatures and pressures to fill the cavity and molding chamber, so as to form a thermoplastic, amide-imide resinous polymeric piston ring-shaped blank. The blank should then be allowed to cool below its plastic deformation temperature to solidify its shape and polymeric orientation. The injection molding temperature (polymer melt temperature) is preferably from 630° F. to 670° F., which is above the plastic deformation temperature of the amide-imide polymer.

The total molding and cooling time ranges from 30 to 120 seconds, depending on the grade of the polymeric resin and the desired cross-sectional thickness of the molded piston ring. After the blank has cooled below its plastic deformation temperature, the core 140 is removed and the blank is removed from the mold. Thereafter, the resinous sprue and runners are removed, either manually or mechanically, to form the blank 142 shown in FIG. 6. The injection molded blank 142 has an outer bearing surface 100, an inner piston-engaging surface 102, and a circular diaphragm 144 which covers the central hole 146.

The cooled molded engine part providing the blank is then post cured by solid state polymerization by progressively heating the molded engine part below its melting temperature to enhance its dimensional strength and integrity. The specific time and temperatures depend upon the desired size of the molded part.

In the preferred method of post curing, the molded engine part is preheated in the presence of a circulating gas in an oven for a period of time such that a major portion of the volatiles contained in the injection molded engine part are vaporized and removed, while simultaneously increasing the deflection temperature of the polymer from about 15° F. to 35° F. without deformation of the engine part. Preheating can be carried out by heating the molded part from an initial temperature to a final temperature with either continuous or stepwise increases in temperature over a period of time, or at a single temperature, for a sufficient time to vaporize and remove the volatiles and increase the polymer's deflection temperature.

Imidization, cross-linking and chain extension take place during preheating. Continuous or stepwise preheating increases tensile strength and elongation properties of the molded engine parts.

In order to enhance the physical properties of smaller molded engine parts, it is preferred to continuously preheat the molded part from an initial temperature of 300° F. to 330° F. to a final preheating temperature of 460° F. to 480° F. for about 40 to 60 hours. Alternatively, the molded engine part can be preheated in a stepwise manner from an initial preheating temperature of 300° F. to 330° F. for 20 to 30 hours to a final preheating temperature of 410° F. to 430° F. for 20 to 30 hours.

Generally, the molded part is heated (post cured) at a temperature of about 330° F. for 24 hours, about 475° F. for 24 hours, and about 500° F. for 24 hours. More specifically, the molded article is heated in the presence of a circulating gas at about 5° F. to 25° F., and preferably about 5° F. to 15° F., below the increased deflection temperature of the polymer for a period of time such that substantial imidization, chain extension and cross-linking take place without deformation of the molded article.

As a result of such heating, water and gases continue to be generated and removed, and the molecular weight and deflection temperature of the polymer are increased. Heating is continued for a period of time sufficient to increase the deflection temperature by about 15° F. to 35° F. Preferably, the heating is at a temperature ranging from about 450° F. to 490° F. for a period of at least 20 hours. Thereafter, the temperature is increased to about 5° F. to 25° F. below the polymer's new deflection temperature and held at the new temperature for a sufficient time to increase the polymer's deflection temperature by about 15° F. to 35° F. Preferably, such heating is at about 480° F. to 520° F. for a period of at least 20 hours.

Heating is continued in this manner to increase the polymer's deflection temperature to its maximum attainable value without deformation of the molded article. The final heating stage is carried out at about 5° F. to 25° F., and preferably from about 5° F. to 15° F., below the maximum attainable temperature for at least 20 hours, and most preferably at least 40 hours. The heated part is then cooled.

In order to best enhance the physical properties of the molded engine part, it is preferred to heat the molded part from about 460° F. to about 480° F. for about 20 to 30 hours, then from about 490° F. to 510° F. for about 20 to 30 hours, and subsequently from about 495° F. to about 525° F. for about 20 to 60 hours.

Post curing should be carried out in the presence of a circulating gas which flows through and around the molded engine part to remove water and gases from the polymeric resin. The amount of circulation and the circulation flow pattern should be coordinated to maximize removal of water and the gases without causing substantial variations in temperature. While inert gases, such as nitrogen, can be used, it is preferred that the circulating gas be an oxygen-containing gas, most preferably air, because oxygen tends to facilitate cross-linking of the polymer molecules. Post curing is preferably carried out in a circulating air oven, although it can be carried out in any other suitable apparatus.

Post cured engine parts are resistant to thermal shock at temperatures of at least 500° F. and exhibit significantly improved tensile strength and elongation as compared with untreated molded, amide-imide resinous engine parts. A more detailed explanation of heat treatment by post curing is described in Chen U.S. Pat. No. 4,167,620, which is hereby incorporated by reference.

After the molded engine part is post cured, the diaphragm 144 (FIG. 6) is removed, preferably by drilling. The faces of the piston ring are then ground to the desired angle. If desired, a solid disc can be injection molded, a hole drilled in the center of the disc, and the annular disc split and ground.

While the machining operations described above are preferably conducted after the injection molded engine part is post cured, one or more of these machining operations can be conducted before post curing if desired.

The composite engine part and the thermoplastic, amide-imide resinous polymer contained therein substantially maintain their shape, dimensional stability and structural integrity at engine operating conditions. Usual engine operating temperatures do not exceed 350° F. Oil cooled engine operating temperatures range from about 200° F. to 250° F. Advantageously, the composite thermoplastic, amide-imide resinous, polymeric engine part is impervious and chemically resistant to oil, gasoline, diesel fuel, and engine exhaust gases at engine operating conditions.

The thermoplastic resin in the composite engine part comprises 40% to 100%, preferably 65% to 75%, by weight amide-imide resinous polymer. The polymer is preferably reinforced with graphite fibers and/or glass fibers. In molded parts the fibers have an average length of 6 to 10 mils and a preferred diameter of about 0.2 to 0.4 mils. The ratio of the length to diameter of the fibers is from 2 to 70, averaging about 20. While the above fiber lengths and diameters are preferred for best structural strength, other lengths and diameters can be used, if desired. The graphite fibers can be granulated or chopped and can be optionally sized or coated with a polysulfone sizing or some other polymer which will maintain its structural integrity at engine operating conditions. The glass fibers can be milled or chopped and can be sized with silane or some other polymer that maintains its structural integrity at engine operating conditions. Chopped graphite and glass fibers are preferably sized, while granulated graphite fibers are preferably unsized.

Desirably, the thermoplastic, amide-imide resinous polymer comprises 10% to 50%, preferably 30% to 34%, by weight graphite fibers or 10% to 60%, preferably 30% to 34%, by weight glass fibers. The polymer can have as much as 3% and preferably ½% to 1% by weight powdered or granular polytetrafluoroethylene (PTFE) and/or as much as 6% by weight titanium dioxide. In some circumstances it may be desirable to add more PTFE.

The polymer's molding characteristics and molecular weight can be controlled to facilitate polymerization with an additional monomer, such as trimellitic acid (TMA), and can be prepared with the desired flow properties by the methods described in Hanson U.S. Pat. No. 4,136,085, which is hereby incorporated by reference.

The polymer can be blended with graphite, glass, PTFE, and titanium dioxide by the method described in Chen U.S. Pat. No. 4,224,214, which is hereby incorporated by reference.

The most preferred amide-imide polymer is reinforced with 30% by weight graphite fibers and has the following engineering properties:

TABLE I

| Property | Typical Value | Units | ASTM Test Method |
|---|---|---|---|
| Mechanical Properties | | | |
| Tensile Strength | | psi | D1708 |
| @ −321° F. | 22,800 | | |
| @ 73° F. | 29,400 | | |
| @ 275° F. | 22,800 | | |
| @ 450° F. | 15,700 | | |
| Tensile Elongation | | % | D1708 |
| @ −321° F. | 3 | | |
| @ 73° F. | 6 | | |
| @ 275° F. | 14 | | |
| @ 450° F. | 11 | | |
| Tensile Modulus | | psi | D1708 |
| @ 73° F. | 3,220,000 | | |
| Flexural Strength | | psi | D790 |
| @ −321° F. | 45,000 | | |
| @ 73° F. | 50,700 | | |
| @ 275° F. | 37,600 | | |
| @ 450° F. | 25,200 | | |
| Flexural Modulus | | psi | D790 |
| @ −321° F. | 3,570,000 | | |
| @ 73° F. | 2,880,000 | | |
| @ 275° F. | 2,720,000 | | |
| @ 450° F. | 2,280,000 | | |
| Compressive Strength | 32,700 | psi | D695 |
| Shear Strength | | psi | D732 |
| @ 73° F. | 17,300 | | |
| Izod Impact | | ft.-lbs./in. | D256 |
| @ 73° F. | 0.9 | | |
| Thermal Properties | | | |
| Deflection Temperature | | °F. | D648 |
| @ 264 psi | 540 | | |
| Coefficient of Linear Thermal Expansion | $5 \times 10^{-6}$ | in./in./°F. | D696 |
| Thermal Conductivity | 3.6 | btu-in. hr.-ft.$^2$-°F. | C177 |
| Flammability | 94V0 | Underwriters Laboratories | 94 |
| Limiting Oxygen Index | 52 | % | D2863 |
| General Properties | | | |
| Density | 1.42 | g/cc | D792 |
| Hardness "Rockwell" E | 94 | | |
| Water Absorption | 0.26 | % | D570 |

The preferred, glass reinforced, thermoplastic amide-imide resinous polymer comprises 30% by weight glass fibers and has the following properties:

TABLE II

| Property | Typical Value | Units | ASTM Test Method |
|---|---|---|---|
| Mechanical Properties | | | |
| Tensile Strength | | psi | D1708 |
| @ −321° F. | 29,500 | | |
| @ 73° F. | 29,700 | | |
| @ 275° F. | 23,100 | | |
| @ 450° F. | 16,300 | | |
| Tensile Elongation | | % | D 1708 |
| @ −321° F. | 4 | | |
| @ 73° F. | 7 | | |
| @ 275° F. | 15 | | |
| @ 450° F. | 12 | | |
| Tensile Modulus | | psi | D1708 |

TABLE II-continued

| Property | Typical Value | Units | ASTM Test Method |
|---|---|---|---|
| @ 73° F. | 1,560,000 | | |
| Flexural Strength | | psi | D790 |
| @ −321° F. | 54,400 | | |
| @ 73° F. | 48,300 | | |
| @ 275° F. | 35,900 | | |
| @ 450° F. | 26,200 | | |
| Flexural Modulus | | psi | D790 |
| @ −321° F. | 2,040,000 | | |
| @ 73° F. | 1,700,000 | | |
| @ 275° F. | 1,550,000 | | |
| @ 450° F. | 1,430,000 | | |
| Compressive Strength | 34,800 | psi | D695 |
| Shear Strength | | psi | D732 |
| @ 73° F. | 20,100 | | |
| Izod Impact | | ft.-lbs./in. | D256 |
| @ 73° F. | 1.5 | | |
| Thermal Properties | | | |
| Deflection Temperature | | °F. | D648 |
| @ 264 psi | 539 | | |
| Coefficient of Linear Thermal Expansion | $9 \times 10^{-6}$ | in./in./°F. | D696 |
| Thermal Conductivity | 2.5 | $\frac{\text{btu-in}}{\text{hr.-ft.}^2\text{-°F.}}$ | C177 |
| Flammability | 94V0 | Underwriters Laboratories | 94 |
| Limiting Oxygen Index | 51 | % | D2863 |
| Electrical Properties | | | |
| Dielectric Constant | | | D150 |
| @ $10^3$ Hz | 4.4 | | |
| @ $10^6$ Hz | 6.5 | | |
| Dissipation Factor | | | D150 |
| @ $10^3$ Hz | .022 | | |
| @ $10^6$ Hz | .023 | | |
| Volume Resistivity | $6 \times 10^{16}$ | ohms-in. | D257 |
| Surface Resistivity | $1 \times 10^{18}$ | ohms | D257 |
| Dielectric Strength | 835 | volts/mil. | |
| General Properties | | | |
| Density | 1.56 | g/cc | D792 |
| Hardness "Rockwell" E | 94 | | |
| Water Absorption | 0.24 | % | D570 |

The amide-imide polymers are prepared by reacting an aromatic polycarboxylic acid compound (acyl halide carboxylic acid and/or carboxylic acid esters) having at least three carboxylic acid groups such as trimellitic acid (TMA), 4-trimellitoyl anhydride halide (4-TMAC), pyromellitic anhydride, pyromellitic acid, 3,4,3',4' benzophenone tetracarboxylic acid or an anhydride thereof, or oxybis benzene dicarboxylic acid or an anhydride thereof.

The amide-imide polymers are preferably prepared by reacting an acyl halide derivative of an aromatic tricarboxylic acid anhydride with a mixture of largely- or wholly-aromatic primary diamines. The resulting products are polyamides wherein the linking groups are predominantly amide groups, although some may be imide groups, and wherein the structure contains free carboxylic acid groups which are capable of further reaction. Such polyamides are moderate molecular weight polymeric compounds having in their molecule units of:

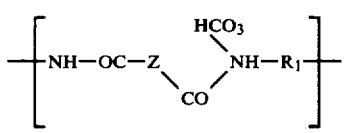

and units of:

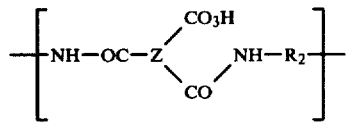

and, optionally, units of:

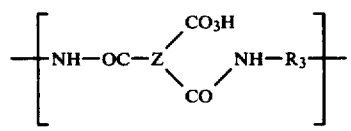

wherein the free carboxyl groups are ortho to one amide group, Z is an aromatic moiety containing 1 to 4 benzene rings or lower-alkyl-substituted benzene rings, $R_1$, $R_2$ and $R_3$ are different and are divalent wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages such as —O—, methylene, —CO—, —SO$_2$—, —S—; for example, —R'—O—R'—, —R'—CH$_2$—R'—, —R'—CO—R'—, —R'—SO$_2$—R'— and —R'—S—R'—.

The polyamides are capable of substantially complete imidization by heating by which they form the polyamide-imide structure having to a substantial extent reoccurring units of:

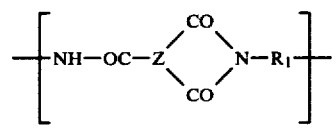

and units of:

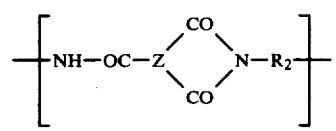

and, optionally, units of:

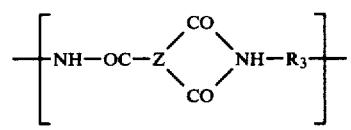

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

The polyamide-imide copolymers are prepared from an anhydride-containing substance and a mixture of wholly- or partially-aromatic primary diamines. Usefully the anhydride-containing substance is an acyl halide derivative of the anhydride of an aromatic tricarboxylic acid which contains 1 to 4 benzene rings or lower-alkyl-substituted benzene rings and wherein two of the carboxyl groups are ortho to one another. More preferably, the anhydride-containing substance is an acyl halide derivative of an acid anhydride having a single benzene or lower-alkyl-substituted benzene ring, and most preferably, the substance is the acyl chloride derivative of trimellitic acid anhydride (4-TMAC).

Usefully the mixture of diamines contains two or more, preferably two or three, wholly- or largely-aromatic primary diamines. More particularly, they are wholly- or largely-aromatic primary diamines containing from 6 to about 10 carbon atoms or wholly- or largely-aromatic primary diamines composed of two divalent aromatic moieties of from 6 to about 10 carbon atoms, each moiety containing one primary amine group, and the moieties linked directly or through, for example, a bridging —O—, —S—, —SO$_2$—, —CO—, or methylene group. When three diamines are used they are preferably selected from the class composed of:

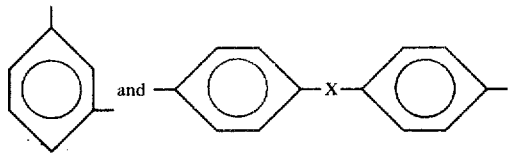

said X being an —O—, —CH$_2$—, or —SO$_2$— group. More preferably, the mixture of aromatic primary diamines is two-component and is composed of meta-phenylene-diamine (MPDA) and p,p'-oxybis(aniline) (OBA), p,p'-methylenebis (aniline) (MBA), and p,p'-oxybis(aniline), p,p'-sulfonylbis(aniline) (SOBA), and p,p'-oxybis(aniline), p,p'-sulfonylbis(aniline) and meta-phenylene-diamine, or p,p'-sulfonylbis (aniline) and p,p'-methylenebis(aniline). Most preferably, the mixture of primary aromatic diamines contains meta-phenylenediamine and p,p'-oxybis(aniline). The aromatic nature of the diamines provides the excellent thermal properties of the copolymers while the primary amine groups permit the desired imide rings and amide linkages to be formed.

When two diamines are used to achieve a polymer usefully combining the properties of both diamines, it is usual to stay within the range of about 10 mole % of the first diamine and 90 mole % of the second diamine to about 90 mole % of the first diamine and 10 mole % of the second diamine. Preferably the range is about a 20 to 80 mole ratio to about an 80 to 20 mole ratio. In the preferred embodiment wherein the acyl chloride of trimellitic acid anhydride is copolymerized with a mixture of p,p'-oxybis(aniline) and meta-phenylenediamine, the preferred range is from about 30 mole % of the former and about 70 mole % of the latter to about 70 mole % of the former and about 30 mole % of the latter.

Although embodiments of the invention have been shown and described, it is to be understood that various modifications and substitutions, as well as rearrangements of structural features and/or process steps, can be made by those skilled in the art without departing from the novel spirit and scope of this invention.

What is claimed is:

1. A composite engine part comprising:
a thermoplastic, amide-imide resinous polymeric piston ring having an inner piston-engaging surface for snap-fitting interlocking engagement with a piston and an outer bearing surface for reciprocatingly sliding against a wall of an engine cylinder, said thermoplastic piston ring providing an oil and exhaust gas-impervious barrier and seal between said piston and said cylinder wall for substantially preventing passage of oil and gas exhaust gases therethrough, said piston ring defining a generally radial access opening, said piston-engaging surface having a diameter slightly smaller than the groove-defining piston surface on which it fits, said piston ring comprising a reaction product of a trifunctional carboxylic acid compound and at least one diprimary aromatic diamine, said piston ring further comprising at least one of the following moieties:

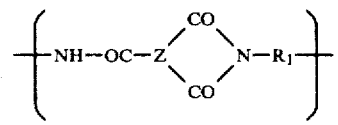

and

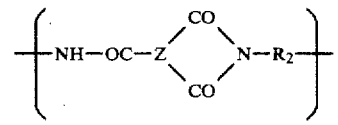

wherein one carbonyl group is meta to and one carbonyl group is para to each amide group and wherein Z is a trivalent benzene ring or lower-alkyl-substituted trivalent benzene ring, R$_1$ and R$_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$—, and —S— radicals and wherein said R$_1$ and R$_2$ containing units run from about 10 mole percent R$_1$ containing unit and about 90 mole percent R$_2$ containing unit to about 90 mole percent R$_1$ containing unit and about 10 mole percent R$_2$ containing unit, and said amide-imide resinous polymeric piston ring comprising at least one of said moieties substantially maintaining its shape and structural integrity at engine operating conditions.

2. A composite engine part in accordance with claim 1 wherein said piston ring is mounted on said piston between a compression ring and an oil scraper ring.

3. A composite engine part in accordance with claim 1 wherein R$_1$ is

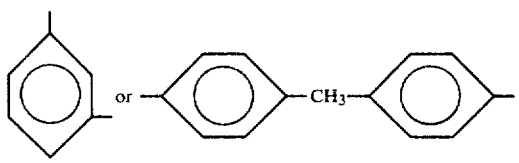

and R$_2$ is

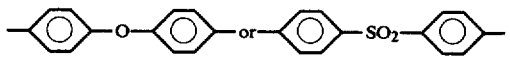

or wherein $R_1$ is

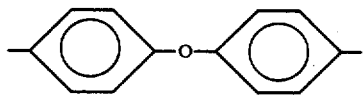

and $R_2$ is

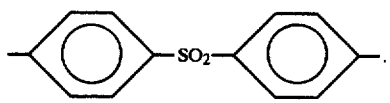

4. A composite engine part in accordance with claim 1 wherein Z is a trivalent benzene ring, $R_1$ is

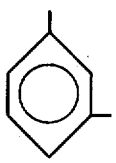

$R_2$ is

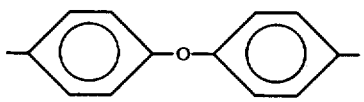

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

5. A composite engine part in accordance with claim 1 wherein said piston ring comprises from 40% to 100% by weight amide-imide resinous polymer.

6. A composite engine part in accordance with claim 5 wherein said piston ring comprises from 65% to 75% by weight amide-imide resinous polymer.

7. A composite engine part in accordance with claim 1 wherein said piston ring comprises a fibrous reinforcing material selected from the group consisting essentially of graphite and glass.

8. A composite engine part in accordance with claim 7 wherein said piston ring comprises from 10% to 50% by weight graphite.

9. A composite engine part in accordance with claim 8 wherein said piston ring comprises from 30% to 34% by weight graphite.

10. A composite engine part in accordance with claim 7 wherein said piston ring comprises 10% to 60% by weight glass.

11. A composite engine part in accordance with claim 10 wherein said piston ring comprises 30% to 34% by weight glass.

12. A composite engine part in accordance with claim 7 wherein said fibrous reinforcing material has a polymeric sizing that substantially maintains its structural integrity at engine operating conditions.

13. A composite engine part in accordance with claim 7 wherein said piston ring comprises not greater than 3% by weight polytetrafluoroethylene.

14. A composite engine part in accordance with claim 13 wherein said piston ring comprises from ½% to 1% by weight polytetrafluoroethylene.

15. A composite engine part in accordance with claim 7 wherein said piston ring comprises not more than 6% by weight titanium dioxide.

16. A process for forming a composite piston ring for use in an engine, comprising the steps of:

molding a thermoplastic amide-imide resinous polymer to form a piston ring having an inner piston-engaging surface for snap fitting interlocking engagement with a piston and an outer bearing surface for reciprocatingly sliding against a wall of an engine cylinder;

preparing said amide-imide polymer by reacting a trifunctional carboxylic acid compound with at least one diprimary aromatic diamine;

said amide-imide polymer comprising one of the following moieties:

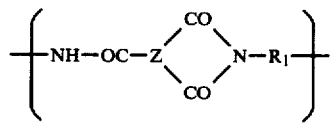

and

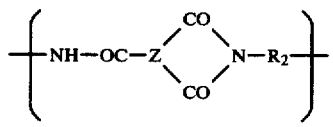

wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit;

allowing said molded piston ring to cool below its plastic deformation temperature; and post curing said piston ring by solid state polymerization to enhance the strength and integrity of said piston ring.

17. A process in accordance with claim 16 including splitting said ring.

18. A process in accordance with claim 16 including grinding at least one of said surfaces.

19. A process in accordance with claim 16 wherein said molding includes compression molding.

20. A process in accordance with claim 16 wherein said molding includes injection molding, said injection molding including inserting a core in a cavity of a mold to define a piston ring-shaped molding chamber and injecting said polymer into said cavity at a location to substantially minimize knit lines in said piston ring.

21. A process in accordance with claim 16 wherein $R_1$ is

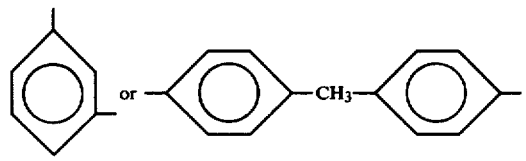

and $R_2$ is

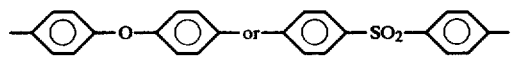

or wherein $R_1$ is

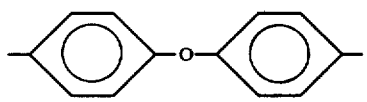

and $R_2$ is

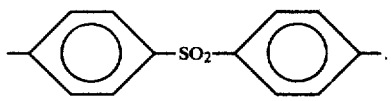

22. A process in accordance with claim 16 wherein Z is a trivalent benzene ring, $R_1$ is

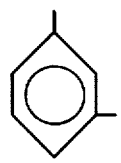

$R_2$ is

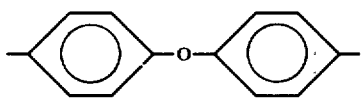

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

23. A process in accordance with claim 16 wherein said polymer comprises from 10% to 50% by weight graphite fibers.

24. A process in accordance with claim 23 wherein said polymer comprises from 30% to 34% by weight graphite fibers.

25. A process in accordance with claim 16 wherein said polymer comprises from 10% to 60% by weight glass fibers.

26. A process in accordance with claim 25 wherein said polymer comprises from 30% to 34% by weight glass fibers.

* * * * *